US012631221B2

(12) United States Patent
Matsunaga

(10) Patent No.: US 12,631,221 B2
(45) Date of Patent: May 19, 2026

(54) CLUTCH DEVICE

(71) Applicant: HONDA MOTOR CO., LTD., Tokyo (JP)

(72) Inventor: Naoya Matsunaga, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 19/017,831

(22) Filed: Jan. 13, 2025

(65) Prior Publication Data

US 2025/0277514 A1     Sep. 4, 2025

(30) Foreign Application Priority Data

Feb. 29, 2024     (JP) ................................. 2024-029676

(51) Int. Cl.
　　*F16D 13/52*　　(2006.01)
　　*F16D 13/64*　　(2006.01)
　　*F16D 13/68*　　(2006.01)
(52) U.S. Cl.
　　CPC ........... *F16D 13/52* (2013.01); *F16D 13/644* (2013.01); *F16D 13/683* (2013.01)
(58) Field of Classification Search
　　CPC ...... F16D 13/52–2013/565; F16D 3/58; F16D 13/648; F16D 13/644; F16D 13/683; F16H 55/06; F16H 55/17; F16H 2055/178; Y10T 74/19851; Y10T 74/19865
　　See application file for complete search history.

(56) References Cited

U.S. PATENT DOCUMENTS

| | | | |
|---|---|---|---|
| 2002/0170798 A1* | 11/2002 | Sugita | .................... F16D 13/76 |
| | | | 192/70.27 |
| 2007/0089964 A1* | 4/2007 | Yoshinaga | .............. F16D 13/52 |
| | | | 192/214 |
| 2020/0032856 A1* | 1/2020 | Sugano | ................. F02F 7/0004 |
| 2020/0248755 A1 | 8/2020 | Achtsnit et al. | |

FOREIGN PATENT DOCUMENTS

| | | | | |
|---|---|---|---|---|
| JP | 01-067370 U | 4/1989 | | |
| JP | 07-071474 A | 3/1995 | | |
| JP | 11-269507 A | 10/1999 | | |
| JP | 2000055086 A | * 2/2000 | ............. F16D 13/56 | |
| JP | 2022016961 A | * 1/2022 | | |

OTHER PUBLICATIONS

Japanese Notice of Allowance for Japanese Patent Application No. 2024-029676 mailed Jul. 1, 2025.

* cited by examiner

*Primary Examiner* — Richard M Lorence
(74) *Attorney, Agent, or Firm* — Amin, Turocy & Watson, LLP

(57) ABSTRACT

A clutch device includes: a clutch outer rotatably journaled on a driving force transmission shaft and having an outer bottom portion formed in an annular shape and an outer cylindrical portion extending in the axial direction from an outer peripheral edge of the outer bottom portion; and a primary driven gear formed in an annular shape, assembled to the clutch outer, and receiving power from a power source. The outer bottom portion has a gear mounting portion inserted inside the primary driven gear and fitted to the primary driven gear in a relatively non-rotatable manner. The primary driven gear is formed from a first material. At least one of the outer bottom portion and the outer cylindrical portion is formed from a second material. The first material has higher strength than the second material.

8 Claims, 5 Drawing Sheets

LH

LH ←——

CLUTCH DEVICE

BACKGROUND OF THE INVENTION

Priority is claimed on Japanese Patent Application No. 2024-029676, filed Feb. 29, 2024, the content of which is incorporated herein by reference.

FIELD OF THE INVENTION

The present invention relates to a clutch device.

DESCRIPTION OF RELATED ART

In recent years, research and development on weight reduction that contributes to energy efficiency has been conducted in order to ensure that more people have access to affordable, reliable, sustainable, and advanced energy.

A clutch device may be provided in a torque transmission path between a power source such as an engine and a wheel. As a clutch device, there is a multiplate friction clutch. The multiplate friction clutch includes a cylindrical clutch outer that is rotatably journaled on an output shaft, a primary driven gear that is assembled to the clutch outer and receives power from a power source, a clutch center that is supported by the output shaft inside the clutch outer in a relatively non-rotatable manner, and friction members that are supported on the clutch outer and the clutch center in a relatively displaceable manner in the axial direction of the output shaft, and that exert a frictional force when contacting each other and transmit a rotational force from the clutch outer to the clutch center.

United States Patent Application, Publication No. 2020/0248755 discloses a constitution in which a primary driven gear is formed directly on the outer periphery of a clutch outer. In this constitution, the clutch device can be downsized in the axial direction as compared with a constitution in which the primary driven gear is disposed in axially overlapping relation with the clutch outer.

Meanwhile, in the present technology related to weight reduction, the clutch device has the following problems. If the primary driven gear is provided integrally with the clutch outer, the clutch outer also needs to be formed from a high-strength material such as iron in order to ensure the strength of the gear. This may increase the weight of the clutch device as compared with the case where the clutch outer is formed from aluminum.

In order to address the above problems, an object of the present application is to achieve weight reduction of a clutch device. This ultimately contributes to energy efficiency.

SUMMARY OF THE INVENTION

A clutch device according to a first aspect of the present invention includes: a clutch outer (30) that is rotatably journaled on an output shaft (20) and has an outer bottom portion (31) formed in an annular shape coaxial with the output shaft (20) and an outer cylindrical portion (32) extending in an axial direction of the output shaft (20) from an outer peripheral edge of the outer bottom portion (31); a primary driven gear (50) that is formed in an annular shape coaxial with the output shaft (20), is assembled to the clutch outer (30), and receives power from a power source; a clutch center (60) supported on the output shaft (20) in a relatively non-rotatable manner inside the clutch outer (30); and a friction member (70) supported on the clutch outer (30) and the clutch center (60) in a relatively displaceable manner in the axial direction of the output shaft (20), the friction member (70) having a plurality of friction plates (71,72), the friction member (70) exerting a frictional force through mutual contact between the plurality of friction plates (71, 72) and transmitting a rotational force from the clutch outer (30) to the clutch center (60). The outer bottom portion (31) has a gear mounting portion (37) inserted inside the primary driven gear (50) and fitted to the primary driven gear (50) in a relatively non-rotatable manner. The primary driven gear (50) is formed from a first material. At least one of the outer bottom portion (31) and the outer cylindrical portion (32) is formed from a second material. The first material has higher strength than the second material.

According to the first aspect, since the primary driven gear that receives power from the power source is formed from a material having higher strength than at least one of the outer bottom portion and the outer cylindrical portion, it is possible to select a material having a relatively low specific gravity as the material forming the clutch outer. Therefore, while ensuring the strength of the primary driven gear, the weight of the clutch outer can be reduced as compared with a case where the outer bottom portion and the outer cylindrical portion are formed from the same first material as the primary driven gear. Therefore, the weight of the clutch device can be reduced.

A clutch device according to a second aspect of the present invention is the clutch device according to the first aspect, in which the second material may have a lower specific gravity than the first material.

According to the second aspect compared with a case where the outer bottom portion and the outer cylindrical portion are formed from the same first material as the primary driven gear, the clutch outer can be made lighter, and thus the clutch device can be made lighter.

A clutch device according to a third aspect of the present invention is the clutch device according to the first aspect or the second aspect, in which the clutch outer (30) may have an outer shaft portion (33) connected to an inner peripheral edge of the outer bottom portion (31) and supported on the output shaft (20), and the outer shaft portion (33) may be formed from the first material.

According to the third aspect, the strength of the outer shaft portion can be ensured without increasing the size of the outer shaft portion, since the outer shaft portion of the clutch outer particularly requiring strength is formed from the first material.

A clutch device according to a fourth aspect of the present invention is the clutch device according to any one of the first to third aspects, in which the clutch outer (30) may have an outer shaft portion (33) connected to an inner peripheral edge of the outer bottom portion (31) and supported on the output shaft (20). The outer bottom portion (31) may have an outer peripheral connection portion (35) that engages with the primary driven gear (50) and is connected to the outer cylindrical portion (32) and a hub portion (36) that connects the outer peripheral connection portion (35) to the outer shaft portion (33). The hub portion (36) may be disposed between both ends of the primary driven gear (50) in the axial direction.

According to the fourth aspect, the hub portion can receive the load transmitted from the primary driven gear to the outer shaft portion when the primary driven gear receives power. As a result, the wall thickness of the hub portion and its surrounding area can be reduced as compared with a constitution in which the hub portion is axially displaced from the primary driven gear. Therefore, the increase in the weight of the clutch outer can be suppressed.

A clutch device according to a fifth aspect of the present invention is the clutch device according to the fourth aspect, further including a spigot-fit portion (90) where an inner peripheral portion (53) of the primary driven gear (50) and the gear mounting portion (37) are spigot-fitted to each other. The hub portion (36) may radially overlap the spigot-fit portion (90).

According to the fifth aspect, the hub portion can receive the load transmitted radially inward from the primary driven gear through the spigot-fit portion when the primary driven gear receives power. As a result, the wall thickness of the hub portion and its surrounding area can be reduced as compared with a constitution in which the hub portion is at a position not overlapping radially with the spigot-fit portion. Therefore, the increase in the weight of the clutch outer can be more effectively suppressed.

A clutch device according to a sixth aspect of the present invention is the clutch device according to any one of the first to fifth aspects, in which the clutch outer (30) may have an outer shaft portion (33) connected to an inner peripheral edge of the outer bottom portion (31) and inserted over the output shaft (20). The outer bottom portion (31) may have: an outer peripheral connection portion (35) that engages with the primary driven gear (50) and is connected to the outer cylindrical portion (32); and a hub portion (36) that connects the outer peripheral connection portion (35) to the outer shaft portion (33). A connection portion between the hub portion (36) and the outer shaft portion (33) may be disposed between both ends of the primary driven gear (50) in the axial direction.

According to the sixth aspect, the load transmitted radially inward from the primary driven gear toward the outer shaft portion when the primary driven gear receives power can be efficiently released from the hub portion to the outer shaft portion. Therefore, it is possible to suppress the application of excessive load to the connection portion between the hub portion and the outer shaft portion.

A clutch device according to a seventh aspect of the present invention is the clutch device according to the sixth aspect, further including a spigot-fit portion (90) where an inner peripheral portion (53) of the primary driven gear (50) and the gear mounting portion (37) are spigot-fitted to each other. The connection portion between the hub portion (36) and the outer shaft portion (33) may radially overlap the spigot-fit portion (90).

According to the seventh aspect, the load transmitted radially inward from the primary driven gear through the spigot-fit portion when the primary driven gear receives power can be efficiently released from the hub portion to the outer shaft portion by the connection portion between the hub portion and the outer shaft portion. Therefore, it is possible to more effectively suppress the application of excessive load to the connection portion between the hub portion and the outer shaft portion.

A clutch device according to an eighth aspect of the present invention is the clutch device according to any one of the first to seventh aspects, in which the gear mounting portion (37) may have an outer peripheral portion (370) with a tooth portion (38) that meshes with an inner peripheral portion (53) of the primary driven gear (50), and the outer bottom portion (31) may be formed with a lightening hole (43) along the tooth portion (38).

According to the eighth aspect, the hub portion is more likely to deflect around the lightening hole. As a result, the load transmitted from the primary driven gear to the hub portion when the primary driven gear receives power can be dispersed by the deflection of the hub portion. Therefore, it is possible to suppress the concentration of load in a specific location and reduce the wall thickness of the hub portion and its surrounding area.

A clutch device according to a ninth aspect of the present invention is the clutch device according to any one of the first to eighth aspects, further including a fastening member (85) that fixes the primary driven gear (50) and the clutch outer (30) to each other. The gear mounting portion (37) may have an outer peripheral portion (370) with a tooth portion (38) that meshes with an inner peripheral portion (53) of the primary driven gear (50). The fastening member (85) may be disposed radially inward of an outer peripheral end of the tooth portion (38).

According to the ninth aspect, the fastening member can be provided so as not to axially overlap the teeth on the outer periphery of the primary driven gear. Therefore, it is possible to suppress an increase in the outer diameter of the primary driven gear.

DETAILED DESCRIPTION OF THE INVENTION

Figure 1:
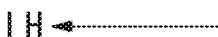
FIG. 1 is a cross-sectional view illustrating a portion of a power unit according to an embodiment.

Hereinafter, an embodiment of the present invention will be described with reference to the drawings. Note that, in the following description, constitutions having the same or similar functions are denoted by the same reference numbers. In addition, redundant descriptions of these constitutions may be omitted. Also, in the following description, directions such as front, rear, up, down, left, and right coincide with directions with respect to a vehicle described below. That is, the left-right direction coincides with the vehicle width direction. Also, in the drawings used in the following description, arrow LH indicates the left side.

FIG. 1 is a cross-sectional view illustrating a portion of a power unit according to an embodiment.

As illustrated in FIG. 1, a clutch device 7 according to the present embodiment is provided integrally with an engine 3 and a transmission 5 as a portion of a power unit 1 mounted on a saddle-ride vehicle such as a motorcycle. The engine 3 includes a crankshaft 10 extending in the vehicle width direction and a crankcase 11 that houses the crankshaft 10. The crankshaft 10 rotates by converting the reciprocating motion of the piston into rotational motion. The crankcase 11 is made of metal and is formed by fastening a left crankcase 11L and a right crankcase 11R, which are divided into right and left halves, to each other.

The transmission 5 is housed in a rear portion of the crankcase 11. The rear portion of the crankcase 11 also serves as a transmission case 11a that houses the transmission 5. The transmission 5 is a stepped transmission having a main shaft 12 and a countershaft 13 rotatably supported in the transmission case 11a, and a transmission gear group 14 extending over the main shaft 12 and the countershaft 13. The main shaft 12 and the countershaft 13 extend in the vehicle width direction. The transmission gear group 14 switches between the gear pairs used for power transmission between the main shaft 12 and the countershaft 13 in the transmission gear group 14 by movement of the shift fork of a change mechanism (not illustrated). The clutch device 7 is coupled to the right end of the main shaft 12. The rotational power of the crankshaft 10 is transmitted to the main shaft 12 via the clutch device 7 and is transmitted from the main shaft 12 to the countershaft 13 via a gear pair of the transmission gear group 14. The countershaft 13 constitutes the output shaft of the power unit 1. The countershaft 13 protrudes to the left of the transmission case 11a and is coupled to a drive sprocket 15. The rotation of the countershaft 13 is transmitted from the left side of the transmission case 11a to a rear wheel via a chain drive power transmission mechanism.

A clutch cover 16 is coupled to the transmission case 11a. The clutch cover 16 is disposed on the right side of the transmission case 11a and is coupled to the right crankcase 11R. The clutch cover 16 is disposed on an extension of the main shaft 12. The clutch cover 16 defines a clutch chamber with the right crankcase 11R.

The clutch device 7 is a multiplate friction clutch that connects and disconnects the power transmission between the crankshaft 10 of the engine 3 and the main shaft 12 of the transmission 5. The clutch device 7 is engaged and disengaged by the operation of a clutch operating element by a driver or the driving of an actuator.

The clutch device 7 is disposed between the transmission case 11a and the clutch cover 16. The clutch device 7 includes a driving force transmission shaft 20 that is provided as the output shaft of the clutch device 7 and rotatably supported by the crankcase 11, a clutch outer 30 that is journaled on the driving force transmission shaft 20 in a relatively rotatable manner, a primary driven gear 50 that is assembled to the clutch outer 30 and receives power from the engine 3, which is a power source, and a clutch center 60 that is supported in a relatively non-rotatable manner by the driving force transmission shaft 20 inside the clutch outer 30.

The clutch outer 30, the primary driven gear 50, and the clutch center 60 are provided so as to be rotatable about the rotation axis of the driving force transmission shaft 20. In the following description, the rotation axis of the driving force transmission shaft 20 is referred to as a common axis O. In addition, the direction along the common axis O is referred to as the axial direction, the direction orthogonal to the common axis O and extending radially from the common axis O is referred to as the radial direction, and the direction circling around the common axis O is referred to as the circumferential direction. In the present embodiment, the axial direction coincides with the vehicle width direction, the axial inside is the direction toward the center of the vehicle along the vehicle width direction, and the axial outside is the direction away from the center of the vehicle along the vehicle width direction.

The driving force transmission shaft 20 is the main shaft 12 of the transmission 5. The driving force transmission shaft 20 is rotatably supported by the right crankcase 11R via a ball bearing 17A and is rotatably supported by the left crankcase 11L via a ball bearing 17B. The driving force transmission shaft 20 extends axially outward from the right crankcase 11R.

The primary driven gear 50 rotates synchronously with the crankshaft 10 by meshing with a primary drive gear 19 that rotates integrally with the crankshaft 10 of the engine 3. The primary driven gear 50 is formed in an annular shape (see FIG. 4). The primary driven gear 50 is disposed so as to overlap the clutch outer 30 from the inside in the axial direction. The entire primary driven gear 50 is disposed inward of the contour of the clutch outer 30 as viewed in the axial direction (see FIG. 3). The primary driven gear 50 is formed from a first material. The first material will be described later.

Figure 2:
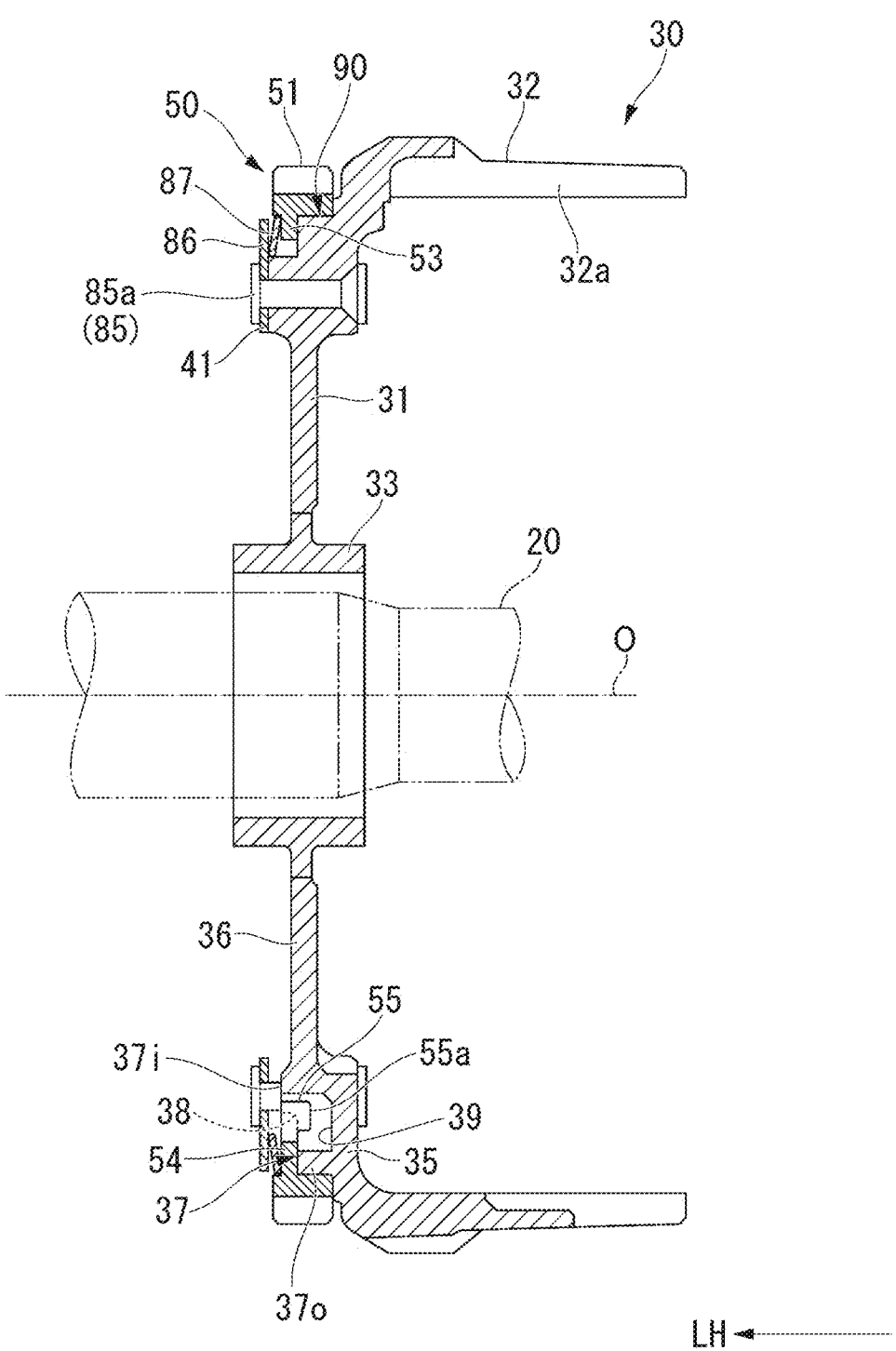
FIG. 2 is a cross-sectional view of a clutch outer and a primary driven gear according to the embodiment.
Figure 3:
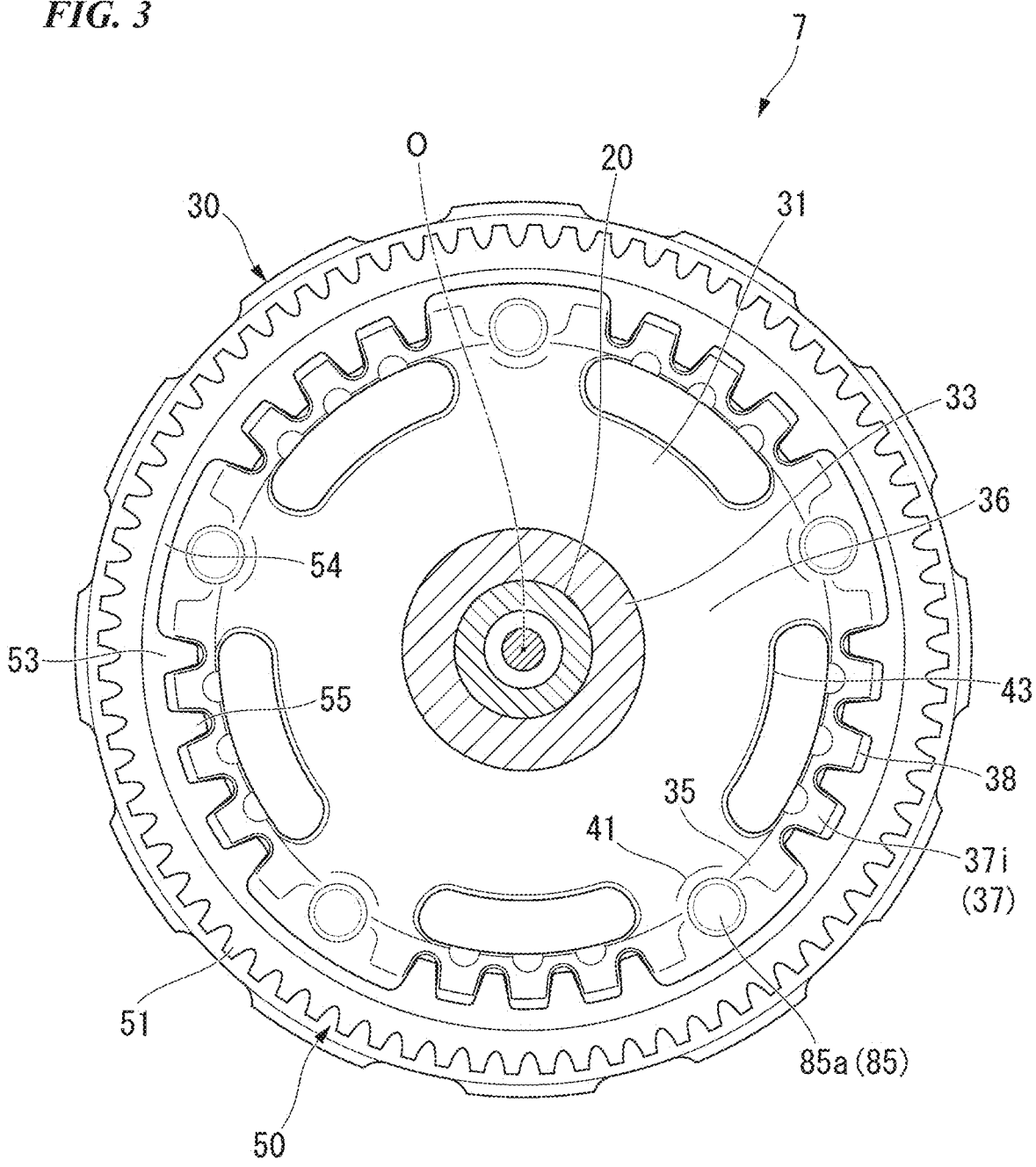
FIG. 3 is a side view of a clutch device according to the embodiment as viewed from the inside in the axial direction, with a pressing plate removed.

FIG. 2 is a cross-sectional view of the clutch outer and primary driven gear according to the embodiment. FIG. 3 is a side view of the clutch device according to the embodiment as viewed from the inside in the axial direction, with a pressing plate and a disc spring removed.

As illustrated in FIGS. 2 and 3, the primary driven gear 50 has a gear outer peripheral portion 51 on which external teeth that mesh with the teeth of the primary drive gear 19 are formed, and a gear inner peripheral portion 53 that is fitted to the clutch outer 30 in a relatively non-rotatable manner. The gear inner peripheral portion 53 includes an inner flange 54 extending radially inward from the inner peripheral surface of the gear outer peripheral portion 51 and extending around the entire circumference, and engaging teeth 55 protruding radially inward from the inner peripheral edge of the inner flange 54. The inner flange 54 is connected to the gear outer peripheral portion 51 in axially spaced relation to both ends in the axial direction on the inner peripheral surface of the gear outer peripheral portion 51. The engaging teeth 55 are formed with protrusions 55a protruding from their tooth tips along the axial direction toward the clutch outer 30 side. The plurality of engaging teeth 55 are provided around the entire circumference. The plurality of engaging teeth 55 are arranged at equally spaced intervals in the circumferential direction, except where rivets 85 described later are arranged.

Figure 4:
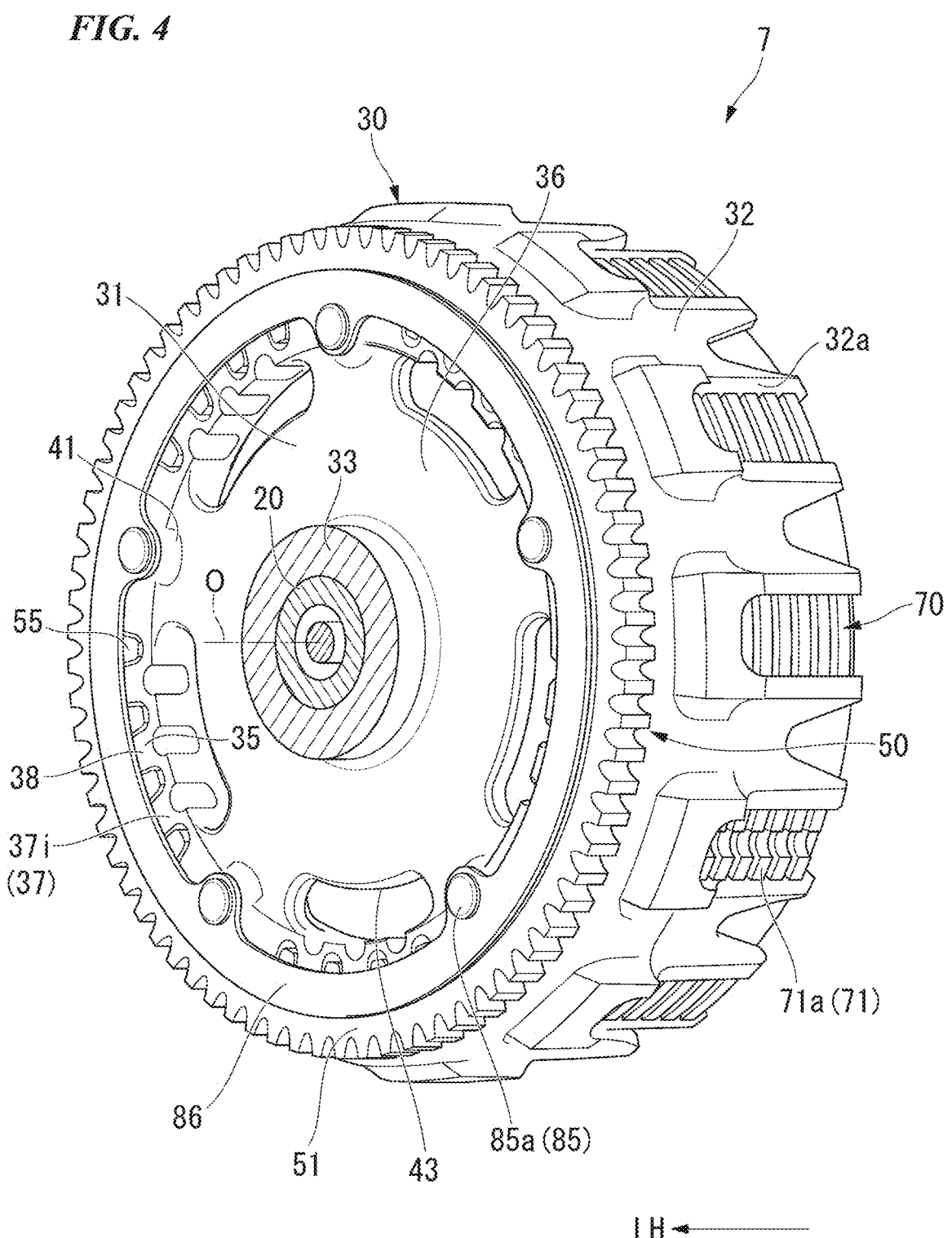
FIG. 4 is a perspective view of the clutch device according to the embodiment as viewed from the inside in the axial direction.

FIG. 4 is a perspective view of the clutch device according to the embodiment as viewed from the inside in the axial direction.

As illustrated in FIGS. 2 and 4, the clutch outer 30 is formed in a bottomed cylindrical shape as a whole. The clutch outer 30 includes an annular outer bottom portion 31, an outer cylindrical portion 32 extending axially outward from the outer peripheral edge of the outer bottom portion 31, and an outer shaft portion 33 connected to the inner peripheral edge of the outer bottom portion 31. The outer bottom portion 31 and the outer cylindrical portion 32 are integrally formed. The outer bottom portion 31 and the outer cylindrical portion 32 are formed from a second material. The second material has a lower strength than the first material. Note that in the present embodiment, the strength compared between the first material and the second material is tensile strength. The second material has a lower specific gravity than the first material. In the present embodiment, the first material is aluminum, and the second material is iron. The outer cylindrical portion 32 is formed with fitting grooves 32a open in the inner peripheral surface thereof. The plurality of fitting grooves 32a are formed at equally spaced intervals in the circumferential direction.

As illustrated in FIGS. 2 and 3, the outer bottom portion 31 overlaps the primary driven gear 50 from the axial outside. The outer bottom portion 31 includes an outer peripheral connection portion 35 that engages with the primary driven gear 50 and is connected to the outer cylindrical portion 32, and an outer hub portion 36 that connects the outer peripheral connection portion 35 to the outer shaft portion 33. The outer peripheral connection portion 35 is formed in an annular shape. The outer peripheral connection portion 35 includes a gear mounting portion 37. The gear mounting portion 37 is provided on the inner periphery of the outer peripheral connection portion 35 and is formed in an annular shape. The gear mounting portion 37 protrudes further inward in the axial direction than the outer periphery of the outer peripheral connection portion 35 and extends around the entire circumference of the outer shaft portion 33. The gear mounting portion 37 is inserted inside the primary driven gear 50. The gear mounting portion 37 is inserted inside the gear inner peripheral portion 53 of the primary driven gear 50 and is fitted to the primary driven gear 50 in a relatively non-rotatable manner.

The gear mounting portion 37 has an outer peripheral portion 370 and an inner peripheral portion 37i. The outer peripheral portion 370 overlaps the inner flange 54 of the primary driven gear 50 from the axial outside and is fitted inside the gear outer peripheral portion 51 of the primary driven gear 50. Thus, the outer peripheral portion 370 of the gear mounting portion 37 and the primary driven gear 50 are spigot-fitted to each other. Hereinafter, the location where the gear mounting portion 37 and the primary driven gear 50 are spigot-fitted to each other will be referred to as a spigot-fit portion 90. The inner peripheral portion 37i protrudes further inward in the axial direction than the outer peripheral portion 370. The inner peripheral portion 37i is disposed inside the gear inner peripheral portion 53 of the primary driven gear 50.

Figure 5:
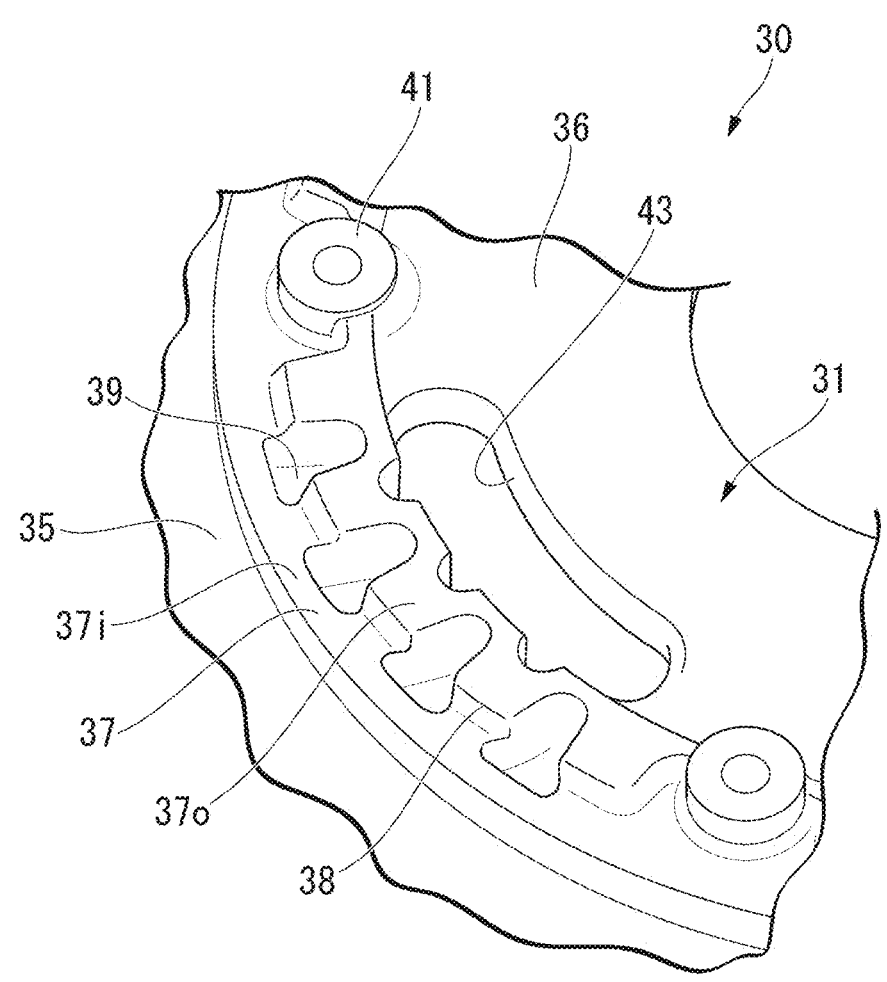
FIG. 5 is an enlarged perspective view illustrating the periphery of a gear mounting portion in the clutch outer according to the embodiment.

FIG. 5 is an enlarged perspective view illustrating the periphery of the gear mounting portion in the clutch outer according to the embodiment.

As illustrated in FIGS. 3 and 5, the inner peripheral portion 37i includes engaged teeth 38 that mesh with the engaging teeth 55 of the primary driven gear 50. The engaged teeth 38 and the engaging teeth 55 are fitted to each other by radial recesses and protrusions. Thus, the inner peripheral portion 37i of the gear mounting portion 37 and the primary driven gear 50 are engaged with each other in a relatively non-rotatable manner. The plurality of engaged teeth 38 are provided around the entire circumference so as to correspond to the engaging teeth 55. The tooth grooves of the engaged teeth 38 are open on the axially inner end surface of the inner peripheral portion 37i. Recesses 39 into which the protrusions 55a of the engaging teeth 55 are inserted are formed in the axially inner end surface of the gear mounting portion 37. The recesses 39 include the tooth grooves of the engaged teeth 38 when viewed from the axial direction. In the illustrated example, the recesses 39 are provided so as to extend across the inner peripheral portion 37i and outer peripheral portion 370 of the gear mounting portion 37. However, the recesses may be provided only in the inner peripheral portion 37i of the gear mounting portion 37.

As illustrated in FIGS. 2 and 3, a fastening seat 41 to which the rivet 85 (fastening member) is attached is provided on the outer bottom portion 31 in such a manner as to be raised inward in the axial direction. The fastening seat 41 is provided in the gear mounting portion 37. A plurality of the fastening seats 41 are provided at equally spaced intervals in the circumferential direction. In the illustrated example, five fastening seats 41 are provided. The fastening seats 41 are arranged inside the primary driven gear 50 as viewed from the axial direction. The fastening seats 41 are located at positions corresponding to the inner peripheral portion 37i of the gear mounting portion 37 in the radial direction. The fastening seats 41 are each formed with a through hole which penetrates the outer bottom portion 31 in the axial direction and into which the rivet 85 is inserted from the inside in the axial direction. The rivet 85 includes a head 85a located axially inside the fastening seat 41. The head 85a of the rivet 85 is disposed radially inward of the outer peripheral ends of the engaged teeth 38. The rivet 85 has a pressing plate 86 sandwiched between the head 85a and the fastening seat 41. The pressing plate 86 is formed in an annular plate shape coaxial with the primary driven gear 50. The pressing plate 86 overlaps the engaging teeth 55 of the primary driven gear 50 when viewed from the axial direction. The pressing plate 86 presses the primary driven gear 50 toward the outer bottom portion 31 side (axially outward) via disc springs 87 to restrict the primary driven gear 50 from falling off. Note that since the power from the engine 3 does not act directly on the rivets 85, it is sufficient if the number and load of the rivets 85 are selected so that the rivets 85 can evenly press the disk springs 87.

As illustrated in FIGS. 2 and 4, the outer hub portion 36 is formed in an annular shape. The outer hub portion 36 is formed in a tabular shape extending orthogonal to the axial direction. The outer peripheral edge of the outer hub portion 36 is connected to the inner peripheral portion 37i of the gear mounting portion 37. The outer hub portion 36 is located between both ends of the gear mounting portion 37 in the axial direction. The outer hub portion 36 radially overlaps the spigot-fit portion 90 between the gear mounting portion 37 and the primary driven gear 50. Further, the outer hub portion 36 overlaps in the radial direction the meshing part between the engaging teeth 55 of the primary driven gear 50 and the engaged teeth 38 of the gear mounting portion 37. A lightening hole 43 is formed in the outer hub portion 36. The lightening hole 43 penetrates the outer hub portion 36 in the axial direction. A plurality of the lightening holes 43 are formed at equally spaced intervals in the circumferential direction. In the present embodiment, five lightening holes 43 are formed. The lightening holes 43 are formed so as to avoid the fastening seats 41 in the circumferential direction. The lightening holes 43 are formed in the outer periphery of the outer hub portion 36 along the engaged teeth 38.

The outer shaft portion 33 is formed in a cylindrical shape. The outer shaft portion 33 is inserted over the driving force transmission shaft 20 and rotatably supported by the driving force transmission shaft 20. The outer shaft portion 33 is coupled to the inner peripheral edge of the outer hub portion 36. Thus, the clutch outer 30 is provided as a single member. The outer shaft portion 33 is formed from a first material. The outer shaft portion 33 is joined to the outer hub portion 36 by welding. For example, the outer shaft portion 33 is coupled to the outer hub portion 36 by ring mash welding. The connection portion between the outer shaft portion 33 and the outer hub portion 36 is disposed between both ends of the primary driven gear 50 in the axial direction. The connection portion between the outer shaft portion 33 and the outer hub portion 36 radially overlaps the spigot-fit portion 90 between the gear mounting portion 37 and the primary driven gear 50. Further, the outer hub portion 36 overlaps in the radial direction the meshing part between the engaging teeth 55 of the primary driven gear 50 and the engaged teeth 38 of the gear mounting portion 37.

In the present embodiment, there is no shock-absorbing mechanism between the clutch outer 30 and the primary driven gear 50 to absorb torque fluctuations transmitted from one of the clutch outer 30 and the primary driven gear 50 to the other, and the clutch outer 30 and the primary driven gear 50 always rotate together. Furthermore, in the present embodiment, the clutch outer 30 and the primary driven gear 50 can rotate together by the mesh of the engaging teeth 55 and the engaged teeth 38, and unlike the conventional coupling structure between the primary driven gear and the clutch outer, the primary driven gear 50 is not provided with a through hole into which a boss formed on the clutch outer is inserted.

As illustrated in FIG. 1, the clutch center 60 is disposed inside the outer cylindrical portion 32. The clutch center 60 is formed in an annular shape when viewed from the axial direction. The clutch center 60 includes a center hub portion 61 provided on the inner periphery of the clutch center 60 and spline-fitted to the outer peripheral surface of the driving force transmission shaft 20, an annular pressure-receiving wall portion 62 provided on the outer periphery of the clutch center 60, and a center cylindrical portion 63 extending axially outward from the inner peripheral edge of the pressure-receiving wall portion 62. Note that in the present embodiment, the center hub portion 61, the pressure-receiving wall portion 62, and the center cylindrical portion 63 are formed as separate members, but it is sufficient if the center hub portion 61, the pressure-receiving wall portion 62, and the center cylindrical portion 63 can rotate together. The center hub portion 61 is fastened to the driving force transmission shaft 20 by a nut screwed to the right end of the driving force transmission shaft 20.

The pressure-receiving wall portion 62 is adjacent to and axially faces the outer bottom portion 31 of the clutch outer 30. The pressure-receiving wall portion 62 has a pressure-receiving surface 62a facing axially outward. The pressure-receiving surface 62a is an annular flat surface extending along a direction orthogonal to the axial direction.

The center cylindrical portion 63 is disposed inside the outer cylindrical portion 32. The center cylindrical portion 63 is disposed to face the outer cylindrical portion 32 in the radial direction. The center cylindrical portion 63 is formed with an engaged protrusion 64. The engaged protrusion 64 protrudes outward in the radial direction. The engaged protrusion 64 extends in the axial direction. A plurality of the engaged protrusions 64 are provided at equally spaced intervals in the circumferential direction.

The clutch device 7 further includes a friction plate set 70 (friction member) that is supported on the clutch outer 30 and the clutch center 60 in a relatively displaceable manner in the axial direction and that exerts a frictional force through mutual contact between plates and transmits a rotational force from the clutch outer 30 to the clutch center 60, and a pressure member 75 that is provided so as to be displaceable with respect to the clutch center 60 between a first position where the mutual contact between the plates of the friction plate set 70 is restrained and a second position where the mutual contact between the plates of the friction plate set 70 is released.

The friction plate set 70 is disposed axially outward with respect to the pressure-receiving wall portion 62. The friction plate set 70 is formed entirely in a cylindrical shape and is disposed coaxially with the common axis O. The friction plate set 70 is disposed between the outer cylindrical portion 32 of the clutch outer 30 and the center cylindrical portion 63 of the clutch center 60. The friction plate set 70 is in contact with the pressure-receiving surface 62a of the pressure-receiving wall portion 62. The friction plate set 70 is made up of friction plates 71 and clutch plates 72 stacked so that the friction plates 71 and clutch plates 72 overlap alternately in the axial direction. The friction plates 71 and the clutch plates 72 are each formed in an annular shape and arranged coaxially with the common axis O.

Engagement outer protrusions 71a protruding radially outward are provided on the outer periphery of the friction plates 71. The engagement outer protrusions 71a protrude further outward in the radial direction than the outer peripheral edges of the clutch plates 72. The engagement outer protrusions 71a fit into the fitting grooves 32a of the outer cylindrical portion 32. Thus, the friction plates 71 are fitted to the inner peripheral surface of the outer cylindrical portion 32 so as to be axially slidable and rotate together with the clutch outer 30.

Engagement inner protrusions 72a protruding radially inward are provided on the inner periphery of the clutch plates 72. The engagement inner protrusions 72a protrude further inward in the radial direction than the inner peripheral edges of the friction plates 71. The engagement inner protrusions 72a fit into grooves between the engaged protrusions 64 provided on the center cylindrical portion 63. Thus, the clutch plates 72 are spline-fitted to the outer peripheral surface of the center cylindrical portion 63 so as to be axially slidable and rotate together with the clutch center 60.

When the mutual contact between the friction plates 71 and the clutch plates 72 is established and the friction plate set 70 is frictionally engaged as one unit, the rotational force is transmitted from the clutch outer 30 to the clutch center 60 through the friction plate set 70. When the friction plates 71 and the clutch plates 72 are released from mutual contact, slippage occurs between the friction plates 71 and the clutch plates 72, and the transmission of the rotational force is disconnected.

The pressure member 75 is disposed axially outward with respect to the clutch center 60. The pressure member 75 axially sandwiches the friction plate set 70 with the pressure-receiving wall portion 62 from the opposite side (axial outside) from the clutch center 60 in the axial direction. When in the first position in the axial direction, the pressure member 75 sandwiches the friction plate set 70 with the clutch center 60 and generates a frictional force between the friction plates 71 and the clutch plates 72 to frictionally engage the friction plate set 70 as one unit. The pressure member 75 is displaced axially outward from the first position toward the second position to reduce the frictional force generated between the friction plates 71 and the clutch plates 72, thereby releasing the frictional engagement of the friction plate set 70.

The pressure member 75 is formed in an annular shape when viewed from the axial direction, and is disposed coaxially with the common axis O. The pressure member 75 includes a pressure wall portion 76 provided on the outer periphery thereof. The pressure wall portion 76 faces the friction plate set 70 from the opposite side from the pressure-receiving wall portion 62 of the pressure member 75 in the axial direction. The pressure wall portion 76 has a pressure surface 76a facing axially inward. The pressure surface 76a is an annular flat surface extending along a direction orthogonal to the axial direction. The pressure surface 76a contacts the friction plate set 70 from the opposite side from the pressure-receiving surface 62a of the clutch center 60. The pressure member 75 is biased toward the first position by a spring member (not illustrated). The pressure member 75 is supported at its center by a lifter member 81 described later. The pressure member 75 is pressed axially outward via the lifter member 81 by a push rod (not illustrated) disposed in the driving force transmission shaft 20.

As described above, the clutch device 7 according to the present embodiment includes the clutch outer 30 having the outer bottom portion 31 and the outer cylindrical portion 32 extending in the axial direction from the outer peripheral edge of the outer bottom portion 31, and the primary driven gear 50 assembled to the clutch outer 30 and receiving power from the power source. The outer bottom portion 31 has the gear mounting portion 37 inserted inside the primary driven gear 50 and fitted to the primary driven gear 50 in a relatively non-rotatable manner. The primary driven gear 50 is formed from a first material. The outer bottom portion 31 and the outer cylindrical portion 32 are formed from a second material. The first material has higher strength than the second material. With this constitution, since the primary driven gear 50 that receives power from the power source is formed from a material having higher strength than the outer bottom portion 31 and the outer cylindrical portion 32, it is possible to select a material having a relatively low specific gravity as the material forming the clutch outer 30. Therefore, while ensuring the strength of the primary driven gear 50, the weight of the clutch outer 30 can be reduced as compared with a case where the outer bottom portion and the outer cylindrical portion are formed from the same first material as the primary driven gear 50. In the present embodiment, as the strength of the primary driven gear 50, the tensile strength of the material of the primary driven gear 50 is made higher than the tensile strength of the material of the outer bottom portion 31 and the outer cylindrical portion 32, so that durability against the stress generated at the tooth root of the primary driven gear 50 can be ensured. Therefore, the weight of the clutch device 7 can be reduced.

The second material has a lower specific gravity than the first material. With this constitution compared with a case where the outer bottom portion and the outer cylindrical portion are formed from the same first material as the primary driven gear 50, the clutch outer 30 can be made lighter, and thus the clutch device 7 can be made lighter.

The clutch outer 30 has the outer shaft portion 33 connected to the inner peripheral edge of the outer bottom portion 31 and supported by the output shaft. The outer shaft portion 33 is formed from a first material. With this constitution, since the outer shaft portion 33 of the clutch outer 30 particularly requiring strength is formed from the first material, the strength of the outer shaft portion 33 can be ensured without increasing the size of the outer shaft portion 33.

The clutch outer 30 has the outer shaft portion 33 connected to the inner peripheral edge of the outer bottom portion 31 and supported by the output shaft. The outer bottom portion 31 has the outer peripheral connection portion 35 that engages with the primary driven gear 50 and is connected to the outer cylindrical portion 32 and the outer hub portion 36 that connects the outer peripheral connection portion 35 to the outer shaft portion 33. The outer hub portion 36 is disposed between both ends of the primary driven gear 50 in the axial direction. With this constitution, the outer hub portion 36 can receive the load transmitted from the primary driven gear 50 to the outer shaft portion 33 when the primary driven gear 50 receives power. As a result, the wall thickness of the outer hub portion 36 and its surrounding area can be reduced as compared with a constitution in which the outer hub portion is axially displaced from the primary driven gear 50. Therefore, the increase in the weight of the clutch outer 30 can be suppressed.

The outer hub portion 36 radially overlaps the inner peripheral portion 37i of the primary driven gear 50 and the spigot-fit portion 90 of the gear mounting portion 37. With this constitution, the outer hub portion 36 can receive the load transmitted radially inward from the primary driven gear 50 through the spigot-fit portion 90 when the primary driven gear 50 receives power. As a result, the wall thickness of the outer hub portion 36 and its surrounding area can be reduced as compared with a constitution in which the outer hub portion is at a position not overlapping the spigot-fit portion 90 in the radial direction. Therefore, the increase in the weight of the clutch outer 30 can be more effectively suppressed.

The connection portion between the outer hub portion 36 and the outer shaft portion 33 is disposed between both ends of the primary driven gear 50 in the axial direction. With this constitution, the load transmitted radially inward from the primary driven gear 50 toward the outer shaft portion 33 when the primary driven gear 50 receives power can be efficiently released from the outer hub portion 36 to the outer shaft portion 33. Therefore, it is possible to suppress the application of excessive load to the connection portion between the outer hub portion 36 and the outer shaft portion 33.

The connection portion between the outer hub portion 36 and the outer shaft portion 33 radially overlaps the inner peripheral portion 37i of the primary driven gear 50 and the spigot-fit portion 90 of the gear mounting portion 37. With this constitution, the load transmitted radially inward from the primary driven gear 50 through the spigot-fit portion 90 when the primary driven gear 50 receives power can be efficiently released from the outer hub portion 36 to the outer shaft portion 33 by the connection portion between the outer hub portion 36 and the outer shaft portion 33. Therefore, it is possible to more effectively suppress the application of an excessive load to the connection portion between the outer hub portion 36 and the outer shaft portion 33.

The outer peripheral portion 370 of the gear mounting portion 37 has the engaged teeth 38 that mesh with the engaging teeth 55 of the inner peripheral portion 37i of the primary driven gear 50. The outer bottom portion 31 is formed with the lightening hole 43 along the engaged teeth 38. With this constitution, the outer hub portion 36 is more likely to deflect around the lightening hole 43. As a result, the load transmitted from the primary driven gear 50 to the outer hub portion 36 when the primary driven gear 50 receives power can be dispersed by the deflection of the outer hub portion 36. Therefore, it is possible to suppress the concentration of load in a specific location and reduce the wall thickness of the outer hub portion 36 and its surrounding area.

The clutch device 7 further includes the rivet 85 that fixes the primary driven gear 50 and the clutch outer 30 to each other. The rivet 85 is disposed radially inward of the outer peripheral ends of the engaged teeth 38. With this constitution, the rivet 85 can be provided so as not to overlap axially with the teeth on the outer periphery of the primary driven gear 50. Therefore, it is possible to suppress an increase in the outer diameter of the primary driven gear 50. However, the clutch device may include a screw as the fastening member instead of the rivet 85. If the primary driven gear and the clutch outer are fixed to each other by the screw, the replacement of the primary driven gear becomes easier, and therefore the primary driven gear can be replaced with another one as necessary, such as to change the number of teeth.

Note that the present invention is not limited to the embodiment that has been described above with reference to the drawings, and various modifications are conceivable within the technical scope.

For example, in the above embodiment, an example in which the present invention is applied to a power unit with an engine as a power source has been described, but the present invention may also be applied to a power unit with a motor as a power source.

In the above embodiment, both the outer bottom portion 31 and the outer cylindrical portion 32 of the clutch outer 30 are formed from the second material, but the present invention is not limited to this constitution. That is, it is sufficient if at least one of the outer bottom portion and the outer cylindrical portion may be formed from the second material. Furthermore, in the above embodiment, the outer shaft portion 33 is formed from the same first material as the primary driven gear 50, but the material forming the outer shaft portion is not limited, and may be formed from, for example, the second material.

In the above embodiment, the engaging teeth 55 of the primary driven gear 50 are arranged in the circumferential direction, but the present invention is not limited to this constitution. It is sufficient if the primary driven gear and the gear mounting portion of the clutch outer are engaged at least at one location in the circumferential direction in a relatively non-rotatable manner by radial recesses and protrusions.

Additionally, it is possible to replace the constituent elements in the above-described embodiment with well-known constituent elements as appropriate without departing from the gist of the present invention.

BRIEF DESCRIPTION OF THE REFERENCE SYMBOLS 7 clutch device
20 driving force transmission shaft (output shaft)
30 clutch outer
31 outer bottom portion
32 outer cylindrical portion
33 outer shaft portion
35 outer peripheral connection portion
36 outer hub portion (hub portion)
37 gear mounting portion
38 engaged teeth (tooth portion)
43 lightening hole
50 primary driven gear
60 clutch center
70 friction plate set (friction member)
71 friction plate (friction plate)
72 clutch plate (friction plate)
85 rivet (fastening member)
90 spigot-fit portion

What is claimed is:

1. A clutch device comprising:
a clutch outer that is rotatably journaled on an output shaft and has an outer bottom portion formed in an annular shape coaxial with the output shaft and an outer cylindrical portion extending in an axial direction of the output shaft from an outer peripheral edge of the outer bottom portion;
a primary driven gear that is formed in an annular shape coaxial with the output shaft, is assembled to the clutch outer, and receives power from a power source;
a clutch center supported on the output shaft in a relatively non-rotatable manner inside the clutch outer; and
a friction member supported on the clutch outer and the clutch center in a relatively displaceable manner in the axial direction of the output shaft, the friction member having a plurality of friction plates, the friction member exerting a frictional force through mutual contact between the plurality of friction plates and transmitting a rotational force from the clutch outer to the clutch center,
wherein
the clutch outer has an outer shaft portion connected to an inner peripheral edge of the outer bottom portion and supported on the output shaft,
the outer bottom portion has a gear mounting portion inserted inside the primary driven gear and fitted to the primary driven gear in a relatively non-rotatable manner,
the primary driven gear and the outer shaft portion are formed from a first material,
at least one of the outer bottom portion and the outer cylindrical portion is formed from a second material, and
the first material has higher tensile strength than the second material.

2. The clutch device according to claim 1, wherein the second material has a lower specific gravity than the first material.

3. The clutch device according to claim 1, wherein the outer bottom portion has
an outer peripheral connection portion that engages with the primary driven gear and is connected to the outer cylindrical portion and
a hub portion that connects the outer peripheral connection portion to the outer shaft portion,
the hub portion being disposed between both ends of the primary driven gear in the axial direction.

4. The clutch device according to claim 3, further comprising
a spigot-fit portion where an inner peripheral portion of the primary driven gear and the gear mounting portion are spigot-fitted to each other, wherein
the hub portion radially overlaps the spigot-fit portion.

5. The clutch device according to claim 1, wherein the outer bottom portion has
an outer peripheral connection portion that engages with the primary driven gear and is connected to the outer cylindrical portion and
a hub portion that connects the outer peripheral connection portion to the outer shaft portion, and
a connection portion between the hub portion and the outer shaft portion is disposed between both ends of the primary driven gear in the axial direction.

6. The clutch device according to claim 5, further comprising
a spigot-fit portion where an inner peripheral portion of the primary driven gear and the gear mounting portion are spigot-fitted to each other, wherein
the connection portion between the hub portion and the outer shaft portion radially overlaps the spigot-fit portion.

7. The clutch device according to claim 1, wherein the gear mounting portion has an outer peripheral portion with a tooth portion that meshes with an inner peripheral portion of the primary driven gear, and
the outer bottom portion is formed with a lightening hole along the tooth portion.

8. The clutch device according to claim 1, further comprising
a fastening member that fixes the primary driven gear and the clutch outer to each other, wherein
the gear mounting portion has an outer peripheral portion with a tooth portion that meshes with an inner peripheral portion of the primary driven gear, and the fastening member is disposed radially inward of an outer peripheral end of the tooth portion.

* * * * *